(12) United States Patent
Kekre et al.

(10) Patent No.: US 7,308,545 B1
(45) Date of Patent: Dec. 11, 2007

(54) METHOD AND SYSTEM OF PROVIDING REPLICATION

(75) Inventors: Anand A. Kekre, Pune (IN); Ronald S. Karr, Palo Alto, CA (US); John A. Colgrove, Los Altos, CA (US); Kedar M. Karmarkar, Sunnyvale, CA (US); Raghu Krishnamurthy, Cupertino, CA (US); Saurabh R. Godbole, Pune (IN); Ming Xu, San Ramon, CA (US); Vikas K. Gupta, Santa Clara, CA (US); Deepak Tawri, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 457 days.

(21) Appl. No.: 10/723,493

(22) Filed: Nov. 26, 2003

Related U.S. Application Data

(63) Continuation-in-part of application No. 10/436,345, filed on May 12, 2003, now Pat. No. 7,191,299.

(51) Int. Cl.
*G06F 12/00* (2006.01)

(52) U.S. Cl. ............ 711/162; 711/161; 707/204
(58) Field of Classification Search ............ None
See application file for complete search history.

(56) References Cited

U.S. PATENT DOCUMENTS

| | | | | |
|---|---|---|---|---|
| 6,594,744 | B1 * | 7/2003 | Humlicek et al. | 711/162 |
| 6,647,474 | B2 | 11/2003 | Yanai et al. | 711/162 |
| 6,728,848 | B2 | 4/2004 | Tamura et al. | 711/162 |
| 2003/0167380 | A1 * | 9/2003 | Green et al. | 711/136 |
| 2004/0172577 | A1 * | 9/2004 | Tan et al. | 714/13 |
| 2005/0027748 | A1 * | 2/2005 | Kisley | 707/200 |

* cited by examiner

*Primary Examiner*—Jasmine Song
(74) *Attorney, Agent, or Firm*—Campbell Stephenson LLP

(57) ABSTRACT

A method and system of providing periodic replication is disclosed. According to one embodiment, a method is provided which comprises creating a storage object corresponding to a storage volume, wherein the storage object comprises a point-in-time copy of the storage volume and a storage volume map; and replicating the storage volume using the storage object.

29 Claims, 6 Drawing Sheets

METHOD AND SYSTEM OF PROVIDING REPLICATION

This application is a continuation-in-part of U.S. patent application Ser. No. 10/436,354 now U.S. Pat. No. 7,191,299, entitled "Method and System of Providing Periodic Replication," filed on May 12, 2003 and naming Anand A. Kekre; Ronald S. Karr; John A. Colgrove; Kedar M. Karmarkar; Raghu Krishnamurthy; Saurabh R. Godbole; Ming Xu; Vikas K. Gupta; and Deepak Tawri as inventors.

BACKGROUND

1. Technical Field

The present invention relates to data storage and retrieval generally and more particularly to a method and system of providing periodic replication.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication is one technique utilized to minimize data loss and improve the availability of data in which a replicated copy of data is distributed and stored at one or more remote sites or nodes. In the event of a site migration, failure of one or more physical disks storing data or of a node or host data processing system associated with such a disk, the remote replicated data copy may be utilized, ensuring data integrity and availability. Replication is frequently coupled with other high-availability techniques such as clustering to provide an extremely robust data storage solution.

Replication may be performed by hardware or software and at various levels within an enterprise (e.g., database transaction, file system, or block-level access) to reproduce data from a replication source volume or disk within a primary node (a primary volume) to a remote replication target volume or disk within a secondary node (a secondary volume). Replication may be synchronous, where write operations are transmitted to and acknowledged by one or more secondary node(s) before completing at the application level of a primary node, or asynchronous, in which write operations are performed at a primary node and persistently queued for forwarding to each secondary node as network bandwidth allows. Asynchronous replication requires writes to be ordered at the secondary node to ensure that the replicated volume is consistent. It also requires the writes to be ordered across a set of volumes if an application (e.g., a database) uses more than one volume at a time. Synchronous replication, while not requiring writes to be ordered suffers from sometimes significant I/O latency which depends on the characteristics of the network.

FIG. 1 illustrates a replication system block diagram according to the prior art. A primary node 100a of the illustrated prior art embodiment includes an application 102a (e.g., a database, mail server, web server, or the like), a file system 104a, a volume manager 106a including a volume replicator 108a or other replication facility, a primary storage volume 110a or "replication source volume", and a replication log 112a as shown. Volume replicator 108a of primary node 100a receives data (e.g., in conjunction with a write operation from application 102a, file system 104a, and/or volume manager 106a) to be stored within primary storage volume 110a. A secondary node 100b of the illustrated prior art embodiment is used as a replication target and includes an application 102b, file system 104b, volume manager 106b and included volume replicator 108b, secondary storage volume 110b or "replication target volume", and a replication log 112b as described herein with respect to primary node 100a. Volume replicator 108a of primary node 100a then stores the received data within primary storage volume 110a and transfers a replicated copy of the data at a block level to a corresponding volume replicator 108b within secondary node 100b over a network 114 (e.g., an IP network, LAN, WAN, or other communication link) coupled between primary node 100a and secondary node 100b.

When replicating synchronously, volume replicators 108 are used to maintain primary and secondary site data synchronization. A write request from application 102a to a synchronously replicated volume such as primary storage volume 110a is considered complete as soon as the update is logged at the primary node 100a, and transmitted to and acknowledged by all secondary sites (e.g., secondary node 100b). Each secondary site confirms an update or write operation in two stages. A first confirmation acknowledges receipt of the update. A second confirmation, indicating that the primary node need no longer keep the update in its replication log (e.g., replication log 112a), is sent when data is stored (e.g., on disk) at the secondary site. Data to be written to primary storage volume 110a is synchronously replicated by first writing the data to replication log 112a. Thereafter, the data may be concurrently written to disk storage associated with primary storage volume 110a and transferred to secondary node 100b. Once the data has been received by secondary node 100b, secondary node 100b confirms its receipt to primary node 100a so that completion of the write operation can be signaled to the write-initiating application (application 102a) and stores the data on disk storage associated with secondary storage volume 110b.

When replication is asynchronous, an application write completes as soon as volume replicator 108a has logged the update in replication log 112a. Transmission and writing to secondary storage volume 110b is concurrent with continued execution of application 102a. Following transfer of data associated with a requested write operation to replication log 112a, completion of the write operation may be signaled to the write-initiating application (application 102a). Thereafter (or concurrently with the signaling of the write operation's completion), the data may be transferred to secondary node 100b. The data is then typically written to disk storage associated with primary storage volume 110a followed by the storage of the data within replication log 112b, receipt confirmation by secondary node 100b to primary node 100a, the storage of the data on disk storage associated with the secondary storage volume 110b, and an indication confirming the occurrence of the write to primary node 100a.

It will be appreciated that a given node can serve as a primary node/replication source volume for one application and as a secondary node/replication target volume for another application. Furthermore, for the same application program, a given node can serve as a secondary node at one point in time and as a primary node at another point in time to "cascade" replication of the data to other nodes connected via communications links. For example, a first replication may be made between nodes in different cities or states, and a node in one of the cities or states can in turn act as the primary node in replicating the data worldwide. Each replication primary node may also have more than one replication secondary node. As used herein, a reference to the secondary node implicitly refers to all secondary nodes associated with a given primary node unless otherwise indicated as identical replication operations are typically performed on all secondary nodes.

SUMMARY OF THE INVENTION

Disclosed is a method and system of providing periodic replication. Embodiments of the present invention may be used to allow data of a storage volume to be replicated between a primary node and secondary node within a storage system using a snappoint storage object corresponding to the storage volume. According to one embodiment, incremental changes to the storage volume during a first time period are tracked using the snappoint storage object. Actual data corresponding to the incremental changes is then replicated (e.g., from the snappoint storage object) between a primary node and secondary node during a second time period.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In periodic replication a secondary site is periodically updated with the changes that have been written to volumes of a primary site over a period of time without having to maintain the order in which data was written by one or more applications. According to one embodiment of the present invention, a method and system of providing periodic replication is provided. According to another embodiment, the described replication is triggered or "initiated" by an external event such as an application request or the occurrence of a pre-defined number or volume of write operations on a primary storage volume. In other alternative embodiments of the present invention, such periodic replication is utilized in conjunction with other replications modes (e.g., synchronous and/or asynchronous). In such alternative embodiments, the mode of replication can be varied (e.g., between periodic as described herein and another replication mode) or multiple replication modes can be implemented substantially simultaneously.

Figure 1:
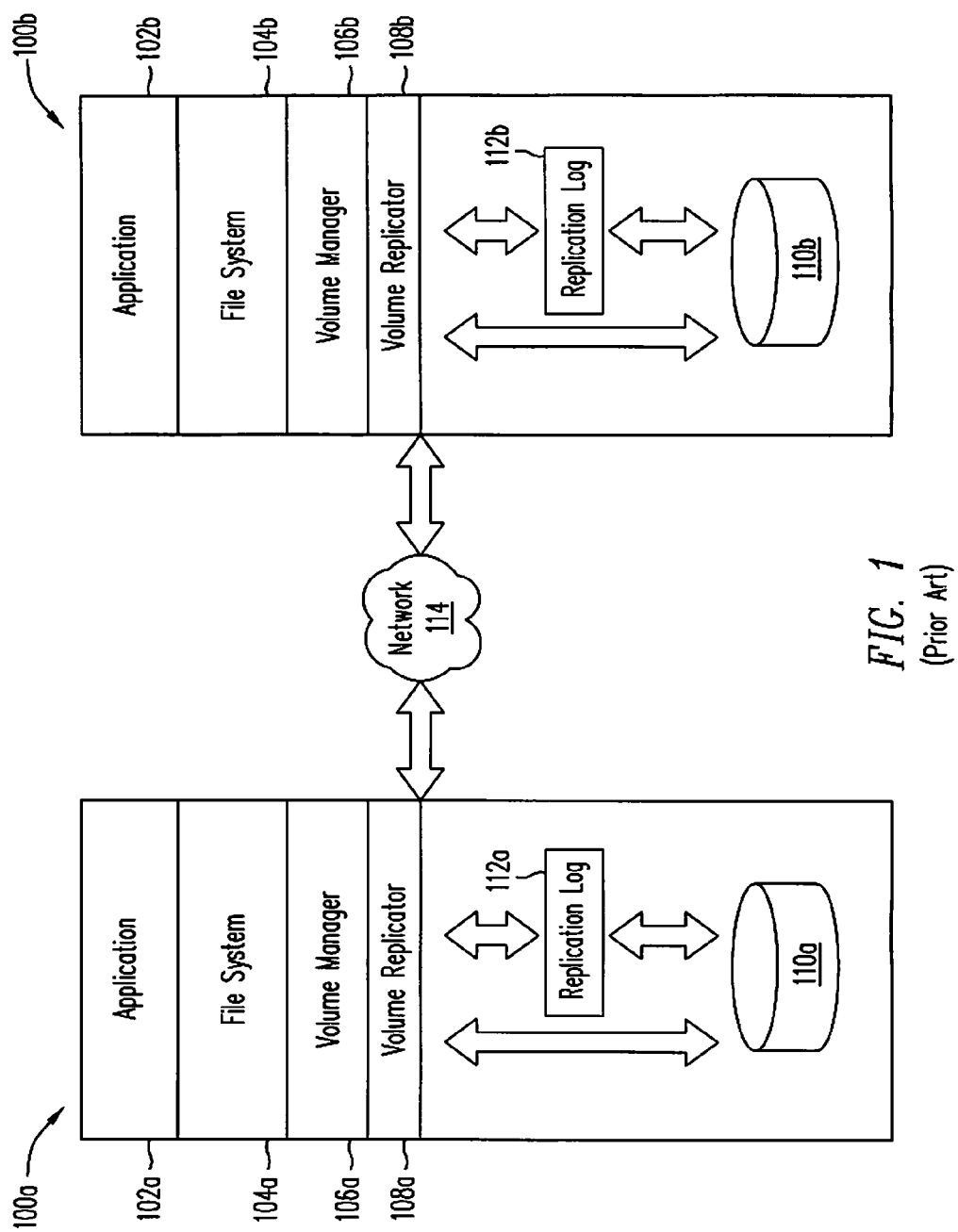
FIG. 1 illustrates a replication system block diagram according to the prior art.
Figure 2:
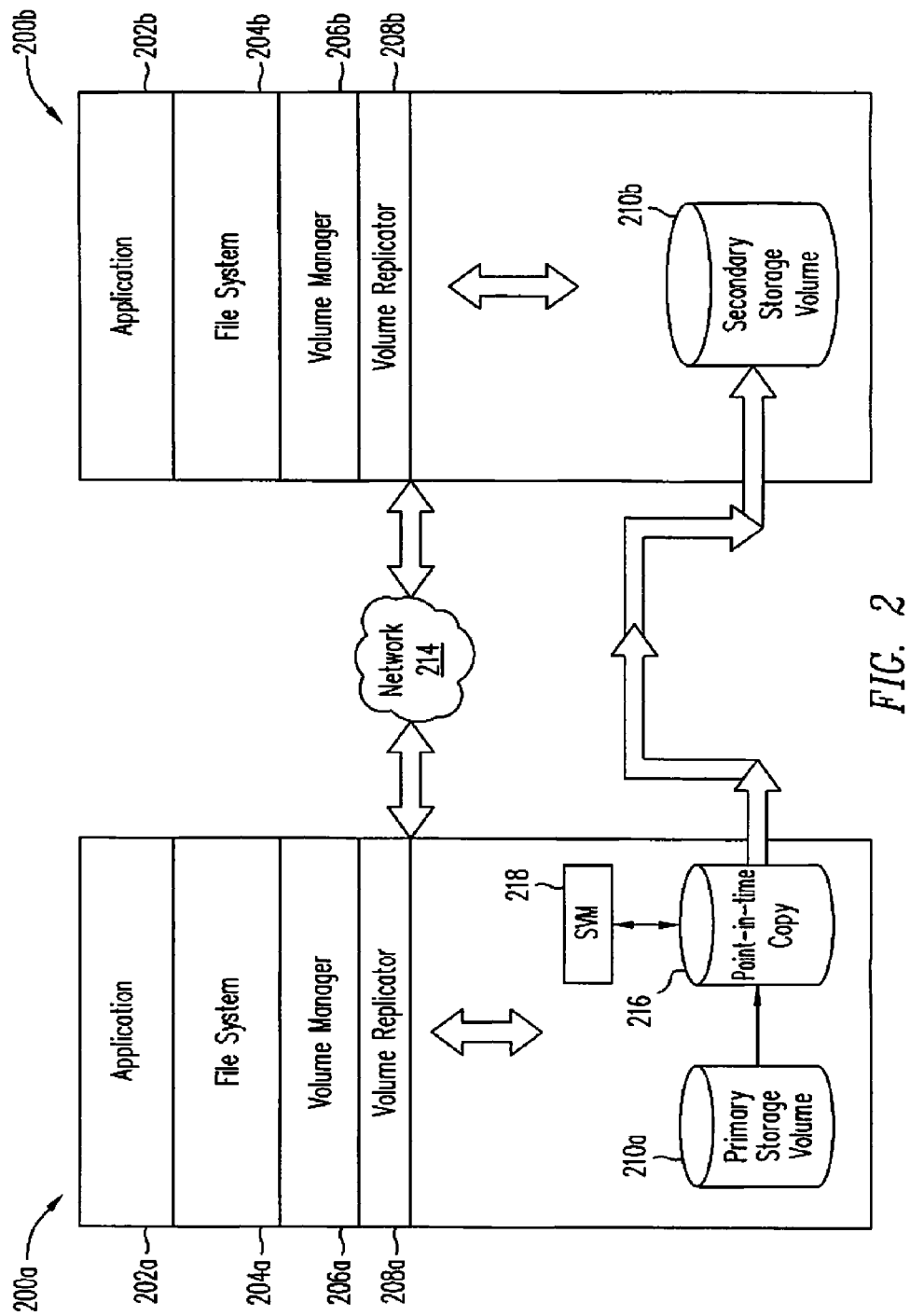
FIG. 2 illustrates an initial synchronization operation within a replication system environment according to an embodiment of the present invention.

FIG. 2 illustrates an initial synchronization operation within a replication system environment according to an embodiment of the present invention. In the replication system of the illustrated embodiment, a primary node 200a is coupled to a secondary node 200b via a network 214 (e.g., an IP network, LAN, WAN, or other communication link). Primary node 200a of the illustrated embodiment includes an application 202a, a file system 204a, a volume manager 206a including a volume replicator 208a or other replication facility, a primary storage volume 210a, and a "snappoint" storage object including a point-in-time copy 216 or "snapshot" of said primary storage volume 210a and a storage volume map 218 "current". Secondary node 200b of the illustrated embodiment includes an application 202b, a file system 204b, a volume manager 206b including a volume replicator 208b or other replication facility, and a secondary storage volume 210b.

While a single primary storage volume (e.g., primary storage volume 210a) has been illustrated herein to avoid unnecessarily obscuring embodiment of the present invention, data associated with an application (e.g., application 202a) may reside on any number of storage volumes forming a single data consistency group. Similarly, while a single secondary node (e.g., secondary node 200b) has been illustrated herein, in an alternative embodiment data may be replicated to multiple secondary nodes. In the described, the frequency with which data is replicated may be varied independently with each secondary replication target node.

Primary node 200a can be implemented within a single host data processing system or, in an alternative embodiment, using a group of two or more host data processing systems operating in coordination to perform replication according to the present invention. In such a distributed environment, storage volumes, snapshots and snappoints can be accessed from more than one data processing system (e.g., host, switch, appliance and/or disk array). According to this embodiment, such data processing systems coordinate point-in-time image creation, snappoint creation, snappoint conversions and I/O operations. One or more data processing systems can execute applications while other systems may be generating snapshots and snappoints, and transferring data to a secondary node independently. Similarly, secondary node 200b can be implemented as such a distributed system.

According to one embodiment of the present invention, the contents of primary storage volume 210a within primary node 200a are transferred to replicated secondary storage volume 210b within secondary node 200b during initial synchronization. To maintain the accessibility of primary storage volume 210a, a point-in-time copy 216 or "snapshot" volume is created and the initial synchronization (as well as subsequent periodic replication) is performed using the snapshot volume. As the initial synchronization is being performed, updates (e.g., write operations or other changes) to the primary storage volume are tracked for later use in performing periodic replication.

A snapshot volume is a point-in-time copy of another volume (e.g., a primary storage volume). A snapshot can be a virtual point-in-time copy or an "instant snapshot", as more fully described in U.S. patent application Ser. No. 10/143,059, entitled, "Method and Apparatus for Creating a Virtual Data Copy," which is incorporated herein by reference in its entirety and for all purposes. Alternatively, such a snapshot can be a complete point-in-time copy also referred to as "real" or "actual" point-in-time copy, e.g., a "break-off" type snapshot such as is described herein. Such instant snapshots can be space-optimized, such that only data modified in the base (e.g., primary) storage volume or the snapshot itself is stored in the snapshot, or full-image, such that all data from a corresponding base volume is copied into the snapshot. A background process can be used to copy data to such a full-image instant snapshot to provide improved utilization and/or performance of applications.

Unlike conventional "break-off"-type snapshots (in which a plex is created and synchronized with the contents of the base or "source" volume), instant snapshots (which utilize the principle of copy-on-write) are available instantaneously after their creation. This allows many snapshot operations (e.g., refresh, restore, reattach) to appear as instantaneous operations to the user. Another benefit of the instant snapshot technique is that, unlike with conventional snapshots, a restore operation associated with an instant snapshot preserves the snapshot's identity, while making the original volume available for access following the restoration operation. Instant snapshots can also afford a user a savings in storage space where space-optimized snapshots are used.

According to one embodiment, changes to a base volume with respect to one or more instant snapshots are tracked using storage volume maps (e.g., per-volume maps or "PVMs"). Accordingly, instants snapshots can be created and organized with greater flexibility than traditional snapshots. Instant snapshots also facilitate multi-node support, and provide the ability to create incremental images and extract changed regions between two or more images described herein in greater detail. A snappoint storage object provides information about the changes to a volume with respect to a point in time image of that volume. Snappoints are described more fully in U.S. patent application Ser. No. 10/264,934 entitled, "Incremental Backup of a Data Volume", which is incorporated herein by reference in its entirety and for all purposes.

Such snappoints give applications the ability to create incremental images of a volume, retrieve the information about the changed regions between any two images and extract the changed regions. According to one embodiment, snappoints are persistent and are managed and controlled by a volume manager, such as the Volume Manager™ provided by VERITAS Software Corporation of Mountain View, Calif. In another embodiment, a snappoint may be one of two varieties: dataful (which preserve a point-in-time image of a volume using an instant snapshot and track changed regions using a storage volume map) and dataless (which merely track changed regions using a storage volume map).

After the creation of the storage object (which includes point-in-time copy 216), a subsequent write operation on storage volume 210a results in the copying of existing data, affected by the write operation, from primary storage volume 210a to point-in-time copy 216. The write operation also results in the modification of storage volume map 218 to indicate the occurrence of the write and to identify the modified regions of primary storage volume 210a. Consequently, point-in-time copy 216 provides a consistent, stable volume which can be synchronized with secondary storage volume 210b (e.g., by copying the data from point-in-time copy 216 to secondary storage volume 210b). Storage volume map 218, indicating write operations as described, may then be subsequently used to perform periodic replication.

According to one embodiment of the present invention, the described initial synchronization is performed using tape backup and restore. In the described embodiment, a tape backup image (or copy) and a storage volume map "current" are concurrently generated on a primary node. Thereafter, the tape backup is moved (either physically or via transfer across a network) to a secondary node and used to synchronize a "secondary" replication target volume. In another embodiment, initial synchronization using the described techniques is avoided by associating (e.g., by attachment) a mirror of storage volume 210a with secondary volume 210b. Such initial synchronization may also be avoided where a storage volume (e.g., primary storage volume 210a) does not contain any valid application or file system data. Such is the case, for example, when primary system 200a and secondary system 200b are newly deployed or reset or following a determination that so such data is present.

Figure 3:
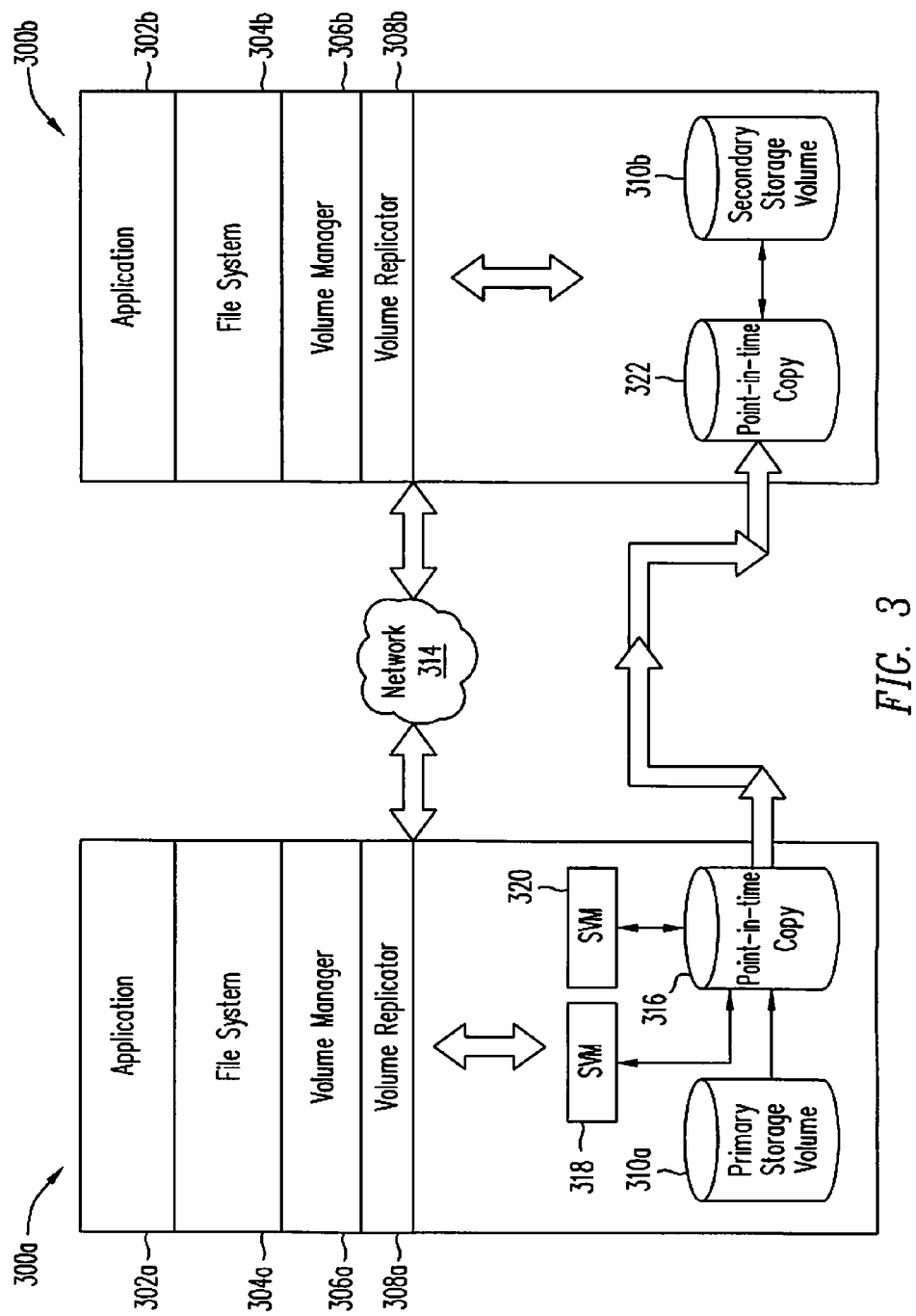
FIG. 3 illustrates a periodic replication operation within a replication system environment according to an embodiment of the present invention.

FIG. 3 illustrates a periodic replication operation within a replication system environment according to an embodiment of the present invention. In the replication system of the illustrated embodiment, a primary node 300a is coupled to a secondary node 300b via network 314 (e.g., an IP network, LAN, WAN, or other communication link). Primary node 300a and secondary node 300b of the illustrated embodiment each respectively include an application 302, a file system 304, and a volume manager 306 including a volume replicator 308 as shown.

In the embodiment of FIG. 3, primary node 300a further includes a primary storage volume 310a, a point-in-time copy 316 of primary storage volume 310a, a storage volume map 318 "current", and a storage volume map 320 "next" while secondary node 300b of the embodiment of FIG. 3 further includes a secondary storage volume 310b and point-in-time copy 322 or "snapshot" volume thereof. It will be readily appreciated that the labels (e.g., "current" and "next") are to some degree arbitrary and that the presence of labels as well as the particular labels depicted in the illustrated embodiment are not intended to limit the scope of the present invention.

In one embodiment, copies of incrementally modified or changed data of a primary storage volume 310a within primary node 300a are transferred to a replicated secondary storage volume 310b within a secondary node 300b periodically. To maintain the accessibility of the primary storage volume, a point-in-time copy 316 of primary storage volume 310a or "snapshot" volume is created and the periodic replication is performed using the snapshot volume. According to one embodiment, the use of a snapshot volume (e.g., point-in-time copy 316) need not be required for initial synchronization and/or periodic data transfer where primary storage volume 310a is not being used by any application during one or more periods of time. In such an embodiment, data can be directly transferred from the primary storage volume itself, to one or more secondary storage volumes.

In the illustrated embodiment of FIG. 3, a point-in-time copy 322 is similarly created and used at secondary node 300b to maintain the accessibility of the secondary storage volume. According to one embodiment, point-in-time copy 322 is used to receive incremental changes from primary node 300a and to periodically restore replicated secondary storage volume 310b. Once the initial synchronization (as described with respect to FIG. 2) is completed, periodic replication can be performed by substantially simultaneously (or atomically) refreshing point-in-time copy 316 of primary storage volume 310a, as more fully described in U.S. patent application Ser. No. 10/326,427 entitled, "Instant Refresh of Data Volume Copy," which is incorporated herein by reference in its entirety and for all purposes.

According to the described embodiment, a storage object is also created at this time which includes a refreshed version of point-in-time copy 316 and storage volume map 320 "next". Thereafter, storage volume map 318 "current" indicates or identifies regions within primary storage volume 310a which were modified during initial synchronization (and subsequent to the creation of the storage object including storage volume map 318) while the storage volume map 320 "next" of the newly created storage object snappoint is utilized to track or identify regions within primary storage volume 310a which were modified following initial synchronization.

Consequently, data associated with incremental changes (e.g., data of primary storage volume 310a which was modified during initial synchronization) is copied from point-in-time copy 316 using the storage volume map 318 "current" to a point-in-time copy 322 or "snapshot" volume on secondary node 300b. The snapshot volume 322 of secondary storage volume 310b can be used to restore secondary storage volume 310b after the data transfer from 316 to 322 is complete. In another embodiment of the present invention, yet another point-in-time copy (not illustrated) of secondary node 300b is used to provide consistent read access while secondary node 300b is being periodically restored.

Figures 4A, 4B, 4C, 4D:
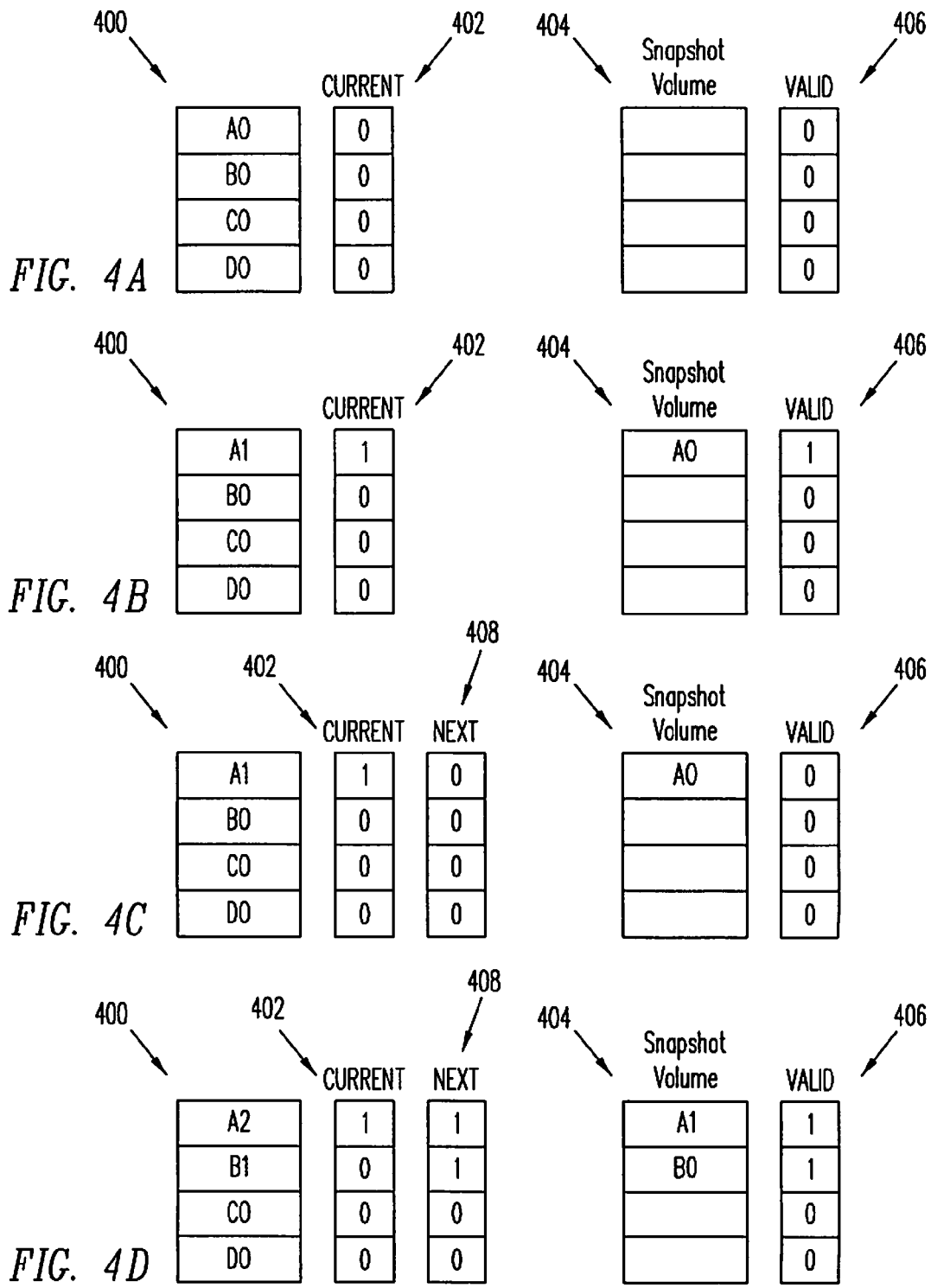
FIGS. 4a-4d illustrate storage objects utilized in an exemplary periodic replication process according to an embodiment of the present invention.

FIGS. 4a-4d illustrate storage objects utilized in an exemplary periodic replication process according to an embodiment of the present invention. FIG. 4a illustrates storage objects at a first time (e.g., T=0) including a primary storage volume 400, a current storage volume map 402, a snapshot volume 404 and a validation map 406. In the illustrated embodiment, primary storage volume 400 stores data (A0, B0, C0, and D0). Current storage volume map 402, having a block corresponding to each region within primary storage volume 400, identifies modified regions within primary storage volume 400 using data values within each corresponding block. Snapshot volume 404 serves as a copy-on-write, point-in-time copy of primary storage volume 400. Validation map 406, having a block corresponding to each region within snapshot volume 404, indicates whether or not snapshot volume 404 contains valid data at each of its region locations.

According to one embodiment of the present invention, a write operation directed to primary storage volume 400 results in original data being copied from a region within primary storage volume 400 to a corresponding region within snapshot volume 404. Such a write operation further results in a bit value being modified (e.g., set to a value corresponding to a logical 'one') in one or more corresponding locations or blocks within current storage volume map 402 and validation map 406. According to the described embodiment, these bit value modifications are used to indicate both that data within primary storage volume 400 has been modified and that snapshot volume 404 stores valid data.

FIG. 4b illustrates storage objects at a second time (e.g., T=1) following a write operation such as that described with respect to FIG. 4a. The storage objects of FIG. 4b include a primary storage volume 400, a current storage volume map 402, a snapshot volume 404 and a validation map 406 as described with respect to FIG. 4a. At the time depicted by FIG. 4b, a write operation of data A1 has been performed on the first region of primary storage volume 400, as shown. Consequently, the data previously stored within this first region of primary storage volume 400 (A0) is transferred or copied into the corresponding first region of snapshot volume 404. Similarly, the first regions or positions within current storage volume map 402 and validation map 406 are "set" to logical 'one' to indicate both that a write operation has been performed at the first region within primary storage volume 400 and that the first region of snapshot volume 404 includes valid data.

According to one embodiment of the present invention, initial synchronization between snapshot volume 404 and a secondary storage volume (not illustrated) can be performed at any time following the creation of a storage object that includes the current storage volume map 402 and snapshot volume 404 (e.g., times illustrated by FIG. 4a or FIG. 4b). In the described synchronization, data is successively read from each region or position of snapshot volume 404. If no write operation has been performed to a corresponding location within primary storage volume 400 (e.g., all positions in FIG. 4a), data is simply read through the snapshot volume 404 to the base primary storage volume 400 and copied into or transferred to a secondary storage volume.

FIG. 4c illustrates storage objects at a third time (e.g., T=2) following the creation of a next storage volume map 408 and prior to the occurrence of any additional write operations on primary storage volume 400. The storage objects of FIG. 4c include a primary storage volume 400, a current storage volume map 402, a next storage volume map 408, a snapshot volume 404 and a validation map 406. According to the embodiment illustrated in FIG. 4c, snapshot volume 404 is "refreshed" by resetting or "clearing" any previously set valid bits within validation map 406 to indicate the absence of valid data within snapshot volume 404, as more fully described in U.S. patent application Ser. No. 10/326,427 entitled, "Instant Refresh of Data Volume Copy", incorporated previously herein. In an alternative embodiment of the present invention, an additional snapshot volume (not illustrated) is created rather than refreshing existing snapshot volume 404. In this embodiment, validation map(s) are unnecessary, and can therefore be removed or omitted.

FIG. 4d illustrates storage objects at a fourth time (e.g., T=3) following the performance of write operations of data A2 and data B1 to the first and second regions of primary storage volume 400 as shown. The storage objects of FIG. 4d include a primary storage volume 400, a current storage volume map 402, a next storage volume map 408, a snapshot volume 404 and a validation map 406. In response to the described write operations, the data previously stored within this first and second regions of primary storage volume 400 (A1 and B0, respectively) is transferred or copied into the corresponding first and second regions of snapshot volume 404. Similarly, the first and second regions or positions within next storage volume map 408 and validation map 406 are "set" to logical 'one' to indicate both that a write operation has been performed and that the snapshot volume 404 includes valid data at the indicated positions. The current storage volume map 402, unchanged, may be utilized to identify data (e.g., data A1) modified during a previous time period within snapshot volume 404 so that data may be periodically replicated according to one or more embodiments of the present invention.

According to one embodiment of the present invention, each region depicted (e.g., within primary storage volume 400, snapshot volume 404, storage volume maps 402, 408, and validation map 406) corresponds to a fixed amount of data within storage such as an individual block or a fixed number of bytes. Accordingly, entire regions are transferred or copied even in case the data change is less in size than the entire region. This may result in sending more data that what is actually required. To overcome this inefficiency in the data transfer, associated extents are stored (either persistently on a persistent storage media such as disk or in a non-persistent store like RAM) in addition to setting a bit in bitmap as described herein. An extent is a group of contiguous file system data blocks defined by a starting block and a length. This extent information is then used to send the exact data that was modified by the application. The extents can be stored on any persistent or non-persistent store in any form (e.g., data structure, order, or the like).

Figure 5:
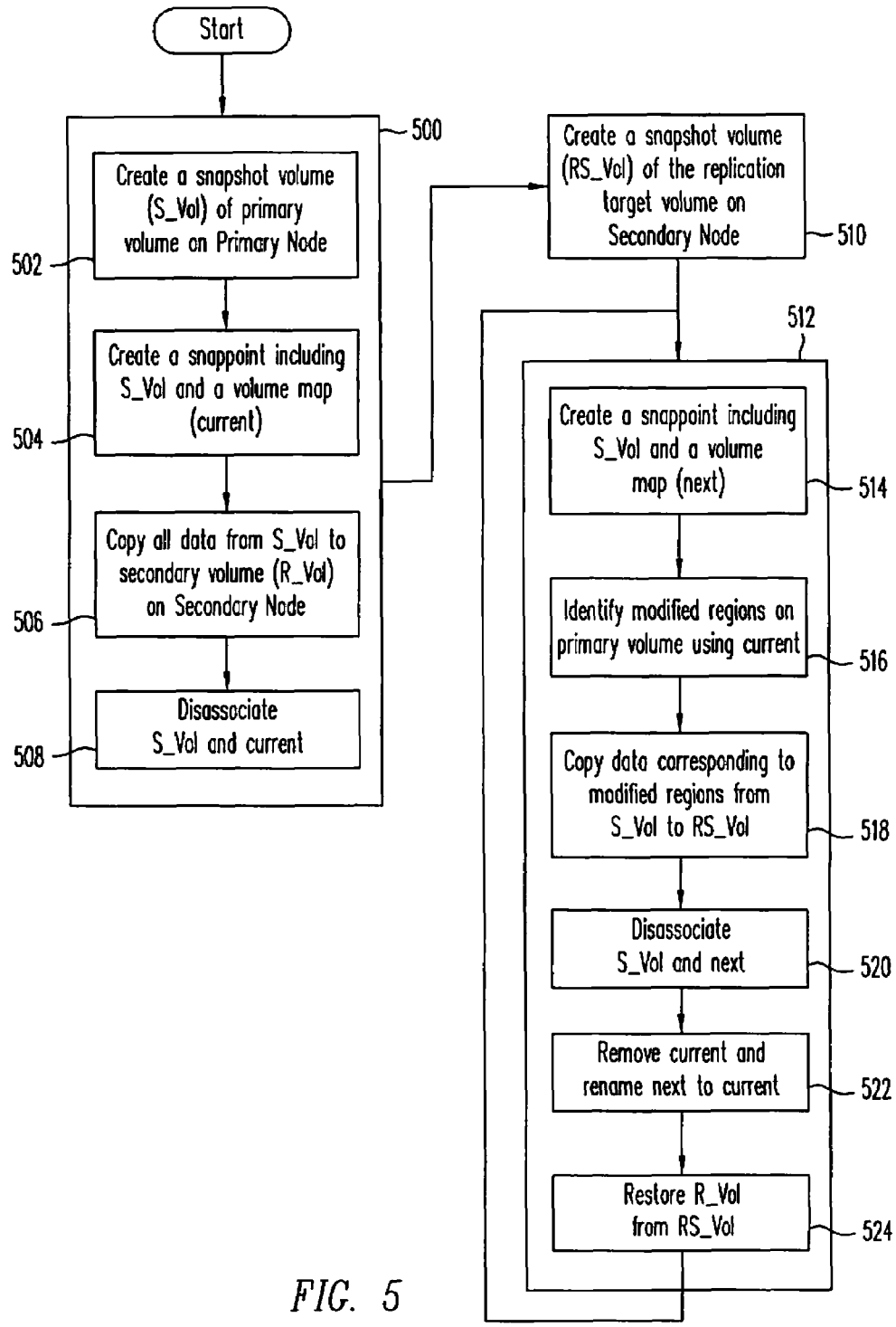
FIG. 5 illustrates a periodic replication process flow diagram according to an embodiment of the present invention.

FIG. 5 illustrates a periodic replication process flow diagram according to an embodiment of the present invention. The illustrated process begins with an initial synchronization subprocess (process block 500) in which a snapshot volume, "S_Vol", of a primary storage volume, "Vol", is created on a primary node (process block 502). Next, a snappoint storage object is created that includes the "S_Vol" snapshot volume and a storage volume map "current" (process block 504). Data is then copied from the "S_Vol" snapshot volume to a secondary, replication target storage volume, "R_Vol", on a secondary node (process block 506) followed by a disassociation of the "S_Vol" snapshot and the "current" storage volume map (process block 508). According to one embodiment, the described snappoint storage object is a dataful snappoint as described herein and the described disassociation of the "S_Vol" snapshot volume and "current" storage volume map includes a conversion of the snappoint storage object to a dataless snappoint.

Thereafter, another "point-in-time copy" snapshot volume, "RS_Vol", of the secondary storage volume, "R_Vol", is created on the secondary node (process block 510) followed by a recurring periodic replication subprocess (process block 512). In the periodic replication subprocess of the illustrated embodiment, another storage object snappoint is created including the "S_Vol" snapshot volume and a storage volume map "next" (process block 514). According to one embodiment, the creation of the described storage object snappoint results in the "S_Vol" snapshot volume being automatically refreshed as described herein. In other embodiments, the "S_Vol" snapshot can be explicitly refreshed, or another point-in-time copy snapshot volume generated.

After the new snappoint storage object has been created, modified regions of the primary storage volume, "Vol", are identified using the current storage volume map (process block 516) and data corresponding to those modified regions is copied from the "S_Vol" snapshot volume on the primary node to the "RS_Vol" snapshot volume on the secondary node (process block 518). In another embodiment, the extent information can be used to identify the exact changes made to the storage volume in order to optimize data transfer, and can be updated as a result of a write operation on the storage volume in addition to a volume map update.

Once the appropriate data has been copied, the "S_Vol" snapshot is disassociated from the "next" storage volume map (process block 520), the "current" storage volume map may be removed (process block 522) or deleted, and the secondary replication target storage volume "R_Vol" restored using the "RS_Vol" snapshot volume (process block 524). In the illustrated process embodiment, the periodic replication subprocess is repeated indefinitely. The process of restoring a storage volume from one of its point-in-time copies (e.g., a snapshot) is more fully described in U.S. patent application Ser. No. 10/254,753 entitled, "Method and Apparatus for Restoring a Corrupted Data Volume", which is incorporated herein by reference in its entirety and for all purposes.

According to one embodiment of the present invention, a replicated secondary storage volume provides a consistent image once the initial synchronization is complete. When the primary node including a primary storage volume crashes, a failover operation to the secondary storage volume is performed and a replicated volume, "R_Vol", used. At this point in the described embodiment, a snapshot volume of the secondary storage volume, "RS_Vol", may be out of synchronization with the replicated secondary storage volume, "R_Vol", including different data within regions identified using blocks of an associated storage volume map.

Consequently, the storage volume map associated with the "RS_Vol" snapshot volume is updated by the secondary node as data is transferred to the "RS_Vol" snapshot during periodic replication. Bits within the "RS_Vol" snapshot volume's storage volume map will be a subset of the "current" storage volume map as the latter is being used to update the "RS_Vol" snapshot. On the primary node, a snapshot volume of the primary storage volume, "S_Vol", will be unsynchronized with respect to the primary storage volume, "Vol", including different data within regions identified using blocks of an associated storage volume map (e.g., the "next" storage volume map). Accordingly, the differences between the primary storage volume and the replicated secondary storage volume following a crash of the primary node can be identified as the "sum" of the "next" and "current" storage volume maps, enabling the replicated secondary storage volume to be resynchronized. According to one embodiment therefore, when a crash occurs at the primary node and a decision is made to failover to a secondary node, an application can immediately start using the replicated secondary storage volume as soon as a command to convert the secondary node to the primary node is returned.

According to one embodiment, the "RS_Vol" snapshot volume may not be in a consistent state following failover due to the fact that data is replicated to "RS_Vol" without considering write order. Consequently, data stored within the "RS_Vol" snapshot may be discarded once failover occurs. In another embodiment of the present invention a dataless snappoint, "failback", is created for the replication target storage volume, "R_Vol", as part of a failover operation and the "RS_Vol" snapshot is disassociated from the snapshot hierarchy of the "R_Vol" replicated volume. The "RS_Vol" snapshot can later be used to resynchronize the primary storage volume from the replicated secondary storage volume during an "easy failback" operation (as described below) and later perform periodic replication when the previous primary assumes the role of secondary. In the described embodiment, all the changes to the "RS_Vol" snapshot volume are tracked using the "failback" snappoint until that time.

Figure 6:
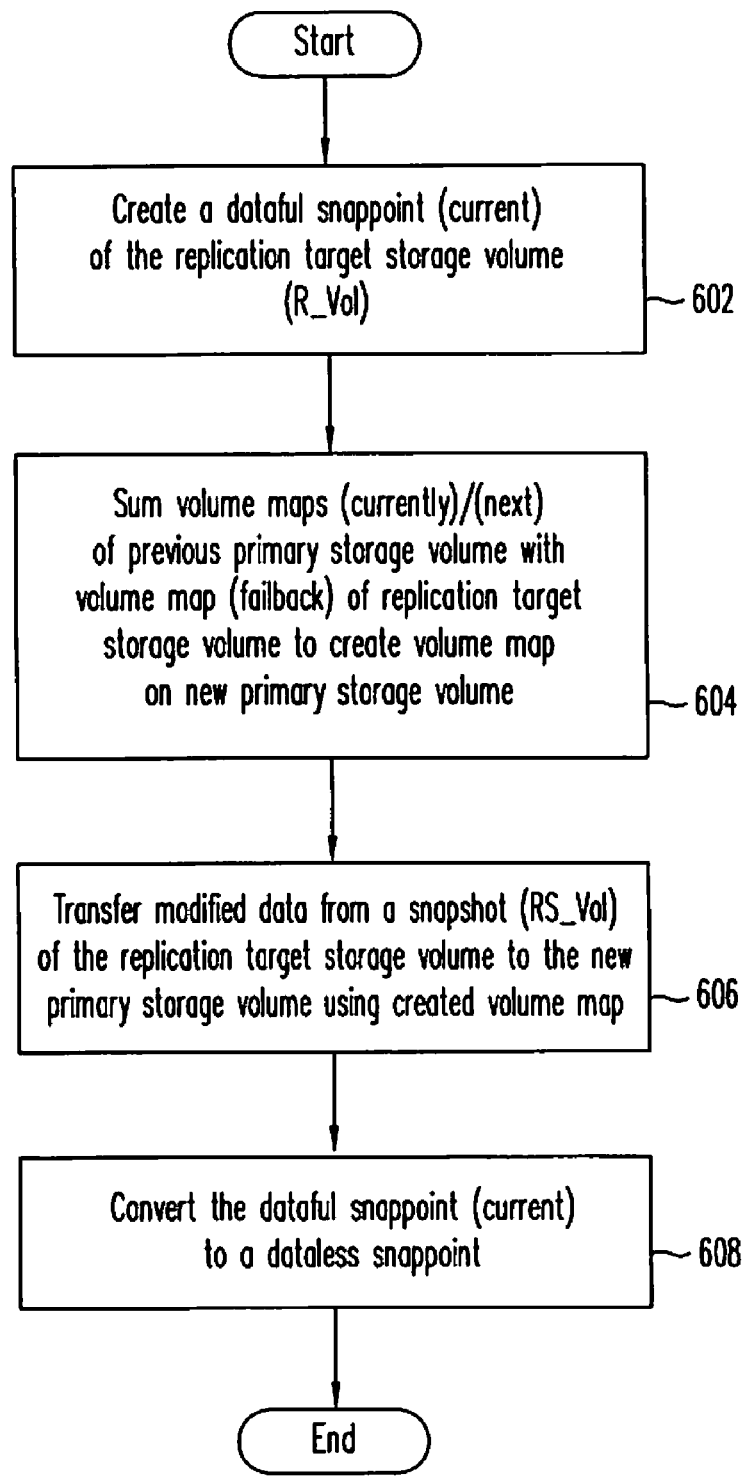
FIG. 6 illustrates an easy failback process flow diagram according to an embodiment of the present invention.

FIG. 6 illustrates an easy failback process flow diagram according to an embodiment of the present invention. Once back online, a previous primary storage volume can assume the role of secondary. Resynchronization is performed in the described embodiment from the "R_Vol" replication target storage volume to the primary storage volume, "Vol" using the "failback" snappoint of the new primary node and snappoints "current" and "next" of the previous primary node.

In the illustrated process embodiment a dataful snappoint "current" of the "R_Vol" replication target storage volume is initially created (process block 602) using the "RS_Vol" snapshot after "RS_Vol" has been refreshed. Thereafter, a storage volume map is created on a new primary node as the sum of the "failback" storage volume map of the new primary storage volume and the "current" and "next" storage volume maps on the previous primary storage volume (process block 604). This generated map is then used to transfer modified data from the "RS_Vol" snapshot to the new primary storage volume (process block 606). The dataful snappoint "current" of the "R_Vol" replication target storage volume is then converted to a dataless snappoint for the next incremental transfer (process block 608). In another embodiment, a new snapshot volume is created rather than refreshing the "RS_Vol" snapshot. Once resynchronization is completed, the periodic replication can be performed as previously described.

In another embodiment of the present invention, a "migration" operation is provided in which a primary storage volume is relocated. According to one embodiment, the described migration requires that all the applications be closed on the existing primary and the previous primary nodes be fully resynchronized. In another embodiment, all snappoints are cleared as a part of migration process. Following migration, the existing primary node can resume the role of the secondary node and the periodic replication can continue.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future. Additionally, it should be understood that embodiments of the present invention are not limited to a particular type of data processing or computer system. Rather, embodiments of the present invention may be implemented in a wide variety of data processing systems (e.g., host computer systems, network switches, network appliances, and/or disk arrays).

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
    creating a first storage object corresponding to a first storage volume, wherein said first storage object comprises a first point-in-time copy of said first storage volume and a first storage volume map;
    replicating said first storage volume using said first storage object, wherein said replicating comprises copying data from said first point-in-time copy of said first storage volume to a second storage volume;
    creating a second storage object corresponding to said first storage volume in response to said copying;
    failing over from said first storage volume to said second storage volume; and
    updating said second storage volume using said first storage object and said second storage object.

2. The method of claim 1, wherein said replicating said first storage volume comprises,
    periodically replicating said first storage volume.

3. The method of claim 1, wherein said creating a first storage object comprises creating a virtual point-in-time copy of said first storage volume.

4. The method of claim 1, wherein said copying data from said first point-in-time copy comprises,
    synchronizing said first point-in-time copy of said first storage volume and said second storage volume.

5. The method of claim 1, wherein said copying data from said first point-in-time copy comprises,
    copying data from said first point-in-time copy of said first storage volume to a point-in-time copy of said second storage volume, and
    restoring said second storage volume using said point-in-time copy of said second storage volume.

6. The method of claim 1, further comprising:
    identifying a first set of one or more modified regions of said first storage volume using said first storage volume map.

7. The method of claim 6, wherein said identifying a first set of one or more modified regions comprises,
    storing an extent, wherein said extent comprises a reference to a modified region of said first set of one or more modified regions and a length.

8. The method of claim 1, wherein said creating a second storage object comprises,
    refreshing said first point-in-time copy of said first storage volume; and
    creating said second storage object corresponding to said first storage volume in response to said refreshing, wherein said second storage object comprises said first point-in-time copy of said first storage volume and a second storage volume map.

9. The method of claim 8, further comprising,
    identifying a second set of one or more modified regions of said first storage volume using said second storage volume map.

10. The method of claim 9, wherein said copying data from said first point-in-time copy comprises,
    copying data corresponding to said first set of one or more modified regions of said first storage volume from said first point-in-time copy of said first storage volume to said second storage volume using said first storage volume map.

11. The method of claim 1, wherein said creating a second storage object comprises,
    creating a second storage object corresponding to said first storage volume wherein said second storage object comprises a second point-in-time copy of said first storage volume and a second storage volume map.

12. The method of claim 11, further comprising,
    identifying a second set of one or more modified regions of said first storage volume using said second storage volume map.

13. The method of claim 12, wherein said copying data from said first point-in-time copy comprises,
    copying data corresponding to said first set of one or more modified regions of said first storage volume from said second point-in-time copy of said first storage volume to said second storage volume using said first storage volume map.

14. The method of claim 1, further comprising:
    creating a third storage object corresponding to a point-in-time copy of said second storage volume.

15. The method of claim 14, further comprising:
    resynchronizing said first storage volume with said second storage volume using said first storage object, said second storage object, and said third storage object.

16. The method of claim 15, further comprising:
    failing back from said second storage volume to said first storage volume.

17. An apparatus comprising:
    means for creating a first storage object corresponding to a first storage volume, wherein said first storage object comprises a first point-in-time copy of said first storage volume and a first storage volume map;
    means for replicating said first storage volume by copying data from said first point-in-time copy of said first storage volume to a second storage volume;
    means for creating a second storage object corresponding to said first storage volume in response to said copying;
    means for failing over from said first storage volume to said second storage volume; and
    means for updating said second storage volume using said first storage object and said second storage object.

18. The apparatus of claim 17, further comprising:
    means for identifying a first set of one or more modified regions of said first storage volume using said first storage volume map.

19. The apparatus of claim 17, wherein said means for creating a second storage object comprises,
    means for refreshing said first point-in-time copy of said first storage volume; and
    means for creating a second storage object corresponding to said first storage volume, wherein said second storage object comprises said first point-in-time copy of said first storage volume and a second storage volume map.

20. The apparatus of claim 17, further comprising:
    means for creating a third storage object corresponding to a point-in-time copy of said second storage volume; and
    means for resynchronizing said first storage volume with said second storage volume using said first storage object, said second storage object, and said third storage object.

21. The apparatus of claim 20, further comprising:
    means for failing back from said second storage volume to said first storage volume.

22. A machine-readable medium having a plurality of instructions executable by a machine embodied therein, wherein said plurality of instructions when executed cause said machine to perform a method comprising:

creating a first storage object corresponding to a first storage volume, wherein said first storage object comprises a first point-in-time copy of said first storage volume and a first storage volume map;

replicating said first storage volume using said first storage object, wherein said replicating comprises copying data from said first point-in-time copy of said first storage volume to a second storage volume;

creating a second storage object corresponding to said first storage volume in response to said copying;

failing over from said first storage volume to said second storage volume; and updating said second storage volume using said first storage object and said second storage object.

23. The machine-readable medium of claim 22, said method further comprising:

identifying a first set of one or more modified regions of said first storage volume using said first storage volume map.

24. The machine-readable medium of claim 22, wherein said creating a second storage object comprises, refreshing said first point-in-time copy of said first storage volume; and creating a second storage object corresponding to said first storage volume in response to said refreshing, wherein said second storage object comprises said first point-in-time copy of said first storage volume and a second storage volume map.

25. The machine-readable medium of claim 22, said method further comprising:

creating a third storage object corresponding to a point-in-time copy of said second storage volume; and resynchronizing said first storage volume with said second storage volume using said first storage object, said second storage object, and said third storage object.

26. The machine-readable medium of claim 25, said method further comprising:

failing back from said second storage volume to said first storage volume.

27. A data processing system comprising:

a storage element to store a first storage volume; and a volume replicator configured to:

create a first storage object corresponding to said first storage volume, wherein said first storage object comprises a first point-in-time copy of said first storage volume and a first storage volume map;

replicate said first storage volume using said first storage object, wherein replicating said first storage volume comprises copying data from said first point-in-time copy of said first storage volume to a second storage volume;

create a second storage object corresponding to said first storage volume in response to copying the data from the first point-in-time copy;

fail over from said first storage volume to said second storage volume; and update said second storage volume using said first storage object and said second storage object.

28. The data processing system of claim 27, wherein said volume replicator is further configured to:

create a third storage object corresponding to a point-in-time copy of said second storage volume; and resynchronize said first storage volume with said second storage volume using said first storage object, said second storage object, and said third storage object.

29. The data processing system of claim 28, wherein said volume replicator is further configured to:

fail back from said second storage volume to said first storage volume.

* * * * *